(12) United States Patent
Braun et al.

(10) Patent No.: US 8,637,197 B2
(45) Date of Patent: Jan. 28, 2014

(54) HIGH EFFICIENCY, REVERSIBLE FLOW BATTERY SYSTEM FOR ENERGY STORAGE

(76) Inventors: Robert J. Braun, Golden, CO (US); Robert J. Kee, Golden, CO (US); Scott Barnett, Evanston, IL (US)

( * ) Notice: Subject to any disclaimer, the term of this patent is extended or adjusted under 35 U.S.C. 154(b) by 0 days.

(21) Appl. No.: 13/432,219

(22) Filed: Mar. 28, 2012

(65) Prior Publication Data

US 2012/0251912 A1     Oct. 4, 2012

Related U.S. Application Data

(60) Provisional application No. 61/468,312, filed on Mar. 28, 2011.

(51) Int. Cl.
*H01M 8/04*    (2006.01)
(52) U.S. Cl.
USPC .......................... 429/417; 429/443
(58) Field of Classification Search
USPC ................................. 429/417, 443
See application file for complete search history.

(56) References Cited

U.S. PATENT DOCUMENTS

| 7,201,979 B2 | 4/2007 | McElroy et al. | |
|---|---|---|---|
| 2005/0048334 A1* | 3/2005 | Sridhar et al. | 429/21 |
| 2006/0134470 A1* | 6/2006 | Kaye et al. | 429/12 |

OTHER PUBLICATIONS

Bents, "High Temperature Solid Oxide Regenerative Fuel Cell for Solar Photovoltaic Energy Storage," 22nd Intersociety Energy Conversion Engineering Conference, Aug. 10-14, 1987, NASA Technical Memorandum 89872, 18 pages.
Bierschenk et al., "High efficiency electrical energy storage using a methane-oxygen solid oxide cell," Energy Environ. Sci., Dec. 20, 2010, available at www.pubs.rsc.org/doi:10.1039/C0EE00457, 8 pages.
McElroy et al., "Optimization & Demonstration of a Solid Oxide Regenerative Fuel Cell System," Technical Progress Report—Year 1, U.S. Dept. of Energy National Energy Technology Lab., Dec. 2004, 35 pages.
Petri, "Advanced Materials for RSOFC Dual Operation with Low Degradation," Versa Power Systems, DOE Hydrogen Program Review, Jun. 11, 2010, 21 pages.
"Versa Power, Boeing in DARPA contract for ultra-long-flight aircraft," Fuel Cells Bulletin, Jan. 2011, vol. 2011, issue No. 1, pp. 4-5.
Wikipedia, "Sabatier reaction," Mar. 4, 2012, available at www.en.wikipedia.org/wiki/Sabatier_reaction, 3 pages.
Wikipedia, "Solid oxide fuel cell," Mar. 20, 2012, available at www.en.wikipedia.org/w/index.php?title=Solid oxide fuel cell&oldid=482944085, 11 pages.
U.S. Appl. No. 13/554,468, Braun et al.
Wikipedia, "Water gas shift reaction," Jan. 23, 2012, available at www.en.wikipedia.org/w/indiex.php?title=Water gas shift reaction & oldid=472764046, 3 pages.
Xu et al., "A novel solid oxide redox flow battery for grid energy storage," Energy Environ. Sci., 2011, vol. 4, pp. 4942-4846.

* cited by examiner

*Primary Examiner* — Ula C Ruddock
*Assistant Examiner* — Frank Chernow
(74) *Attorney, Agent, or Firm* — Sheridan Ross P.C.

(57) ABSTRACT

The present invention relates to a reversible solid oxide electrochemical cell that may operate in two modes: a discharge mode (power generation) and a charge mode (electrolytic fuel production). A thermal system that utilizes a SOFB and is inclusive of selection of operating conditions that may enable roundtrip efficiencies exceeding about 80% to be realized is disclosed. Based on leverage of existing solid oxide fuel cell technology, the system concept is applicable to energy storage applications on the kW to MW scale.

3 Claims, 5 Drawing Sheets

HIGH EFFICIENCY, REVERSIBLE FLOW BATTERY SYSTEM FOR ENERGY STORAGE

CROSS REFERENCE TO RELATED APPLICATION

This non-provisional patent application claims the benefit of priority from U.S. Provisional Patent Application No. 61/468,312, filed Mar. 28, 2011, the entire disclosure of which is hereby incorporated by reference in its entirety.

FIELD OF THE INVENTION

The present invention relates generally to electrochemical devices for energy storage. More specifically, the present invention relates to a reversible solid oxide electrochemical cell that may operate in at least two modes, a discharge mode and a charge mode and a method of using the same.

SUMMARY

The present invention contemplates a novel system, device, and methods for using a high efficiency reversible flow battery system for energy storage. More specifically, the present invention pertains to an innovative system design that incorporates a novel electrochemical device for energy storage and methods for using the same. In various embodiments, the novel device is a reversible solid oxide electrochemical cell that may operate in two modes: discharge mode (power generation) and charge mode (electrolytic fuel production). The reversible solid oxide cell is designated as a solid oxide flow battery (SOFB).

The novel SOFB device is distinct from both solid oxide fuel cells and flow batteries. The SOFB device is different than flow batteries in three primary ways: (i) the circulating fluid that is stored is not a liquid electrolyte, but is instead the reactant and product fluids derived from the electrode reactions at the anode and cathode, (ii) the storage fluids themselves are primarily gaseous (although water may be present in either liquid or gaseous forms for storage); and (iii) the operating temperature is much higher. The SOFB device is also different from solid oxide fuel cells (SOFCs) in that SOFBs operate reversibly rather than in one current direction, and at lower temperature and higher pressure compared to conventional SOFC technologies.

In various embodiments, the present invention comprises a thermal system that utilizes a SOFB and is inclusive of a selection of operating conditions that may enable roundtrip efficiencies exceeding about 80% to be realized. Based on leverage of existing solid oxide fuel cell technology, the system concept is applicable to energy storage applications on the kW to MW scale. Energy storage durations of between about 4-16 hours are expected to be the most likely application, but the actual storage capacity and duration periods are only limited by the size of the storage tanks themselves. In at least some embodiments, the present invention further comprises the basic system configuration, and in particular storage tank types and arrangement, and a range of desirable SOFB operating conditions.

At the system level of some embodiments of the present invention, the SOFB comprises high-performance heat exchangers and/or optional chemical reactors. In still another embodiment, a class of high-effectiveness all-ceramic microchannel heat exchangers is provided. In addition to heat-transfer performance, the ceramic design and fabrication technology leads to low manufacturing cost compared to metallic microchannel alternatives. In some embodiments, the SOFB performance may be enhanced by incorporating catalysts into the heat exchangers. Process embodiments wherein active catalyst washcoats are applied within the microchannels are also contemplated.

In some embodiments, a battery system is provided that may include multiple modes of operation. In some embodiments, a battery system is provided that may include a reversible solid oxide cell and at least one reactant storage tank in which the system may operate in the fuel cell mode or the electrolysis mode, and whereby the operation modes are reversible, thereby allowing the system to serve as an energy storage device and operate at low temperature and high pressure. The battery system may optionally comprise a reversible solid oxide cell stack for power generating (i.e. discharge) or fuel production (i.e. charge) and an integrated 'fuel' reactant storage tank. The storage tank may have a near constant pressure/variable volume characteristic, which may be realized by either partitioning the tank into two distinct storage zones that may be separated by a separation device, such as a free or floating piston, or through use of a bladder. In an embodiment, one side of the tank serves as the storage for SOFC 'fuel' (anode) gases, and the other side of the tank serves as the storage section for SOEC 'fuel' (cathode) gases and an oxidant storage tank is further provided for either gases or liquids.

DETAILED DESCRIPTION

The invention disclosed herein pertains to an innovative system design that incorporates a novel electrochemical device for energy storage. The device of the present invention is a reversible solid oxide electrochemical cell that may operate in at least two modes: discharge mode (power generation) and charge mode (electrolytic fuel production).

The reversible solid oxide cell is designated as a solid oxide 'flow battery'. The novel SOFB device has similarities to, but is distinct from, both solid oxide fuel cells and flow batteries. The SOFB device is different from flow batteries in three primary ways: (i) the circulating fluid that is stored is not a liquid electrolyte, but is instead the reactant and product fluids derived from the electrode reactions at the anode and cathode; (ii) the storage fluids themselves are primarily gaseous (although water may be present in either liquid or gaseous forms for storage); and (iii) the operating temperature is much higher. They are also different than solid oxide fuel cells (SOFCs), as they operate reversibly rather than in one current direction, and at lower temperature and higher pressure. In various embodiments, the present invention comprises a thermal system that utilizes a SOFB and further comprises a selection of operating conditions that may enable high roundtrip efficiencies exceeding about 80% to be realized. Based on leverage of solid oxide fuel cell technology, the system concept is applicable to energy storage applications on the kW to MW scale. Energy storage durations of between about 4 hours to about 16 hours are possible using the present invention, but the actual storage capacity and energy storage duration are only limited by the size of the storage tanks themselves. Thus, it is understood that the size of the storage tank may be any suitable size for the application.

Figure 1:
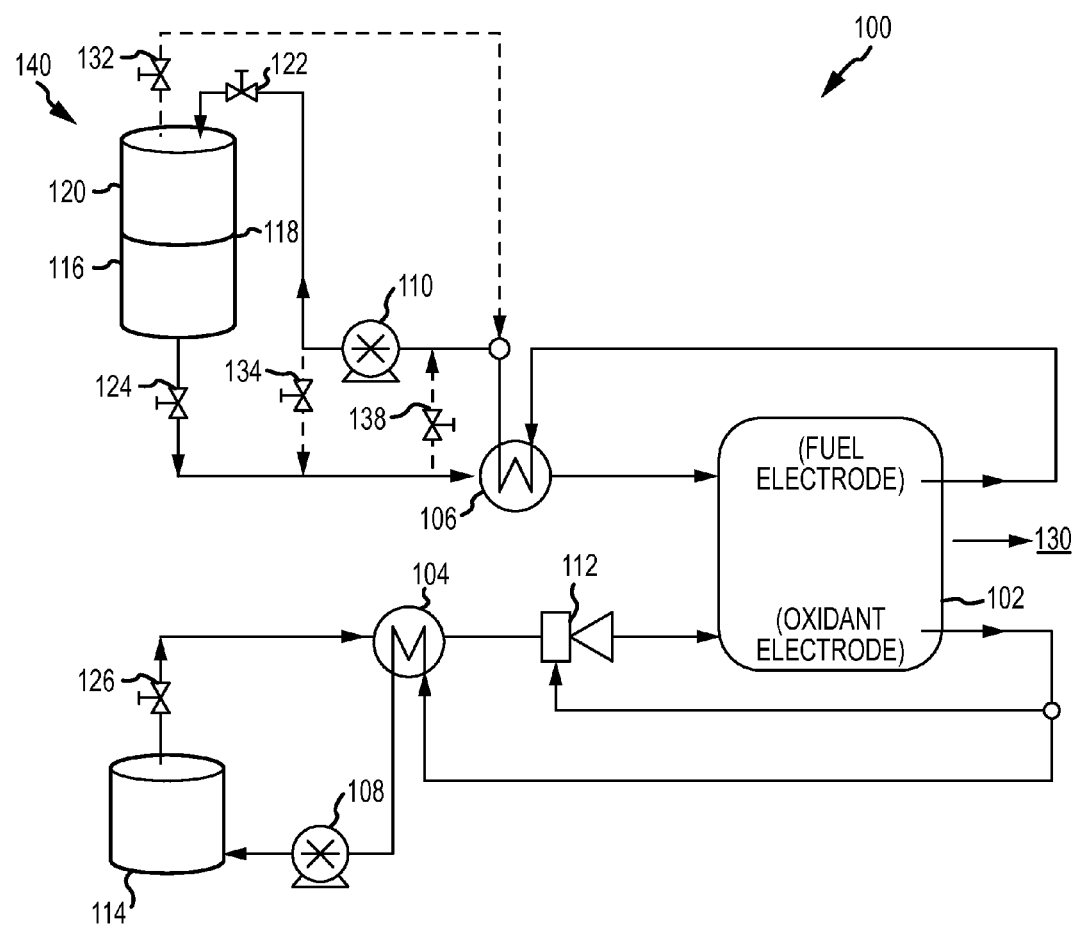
FIG. 1 illustrates an advanced energy storage device in the discharge mode.
Figure 2:
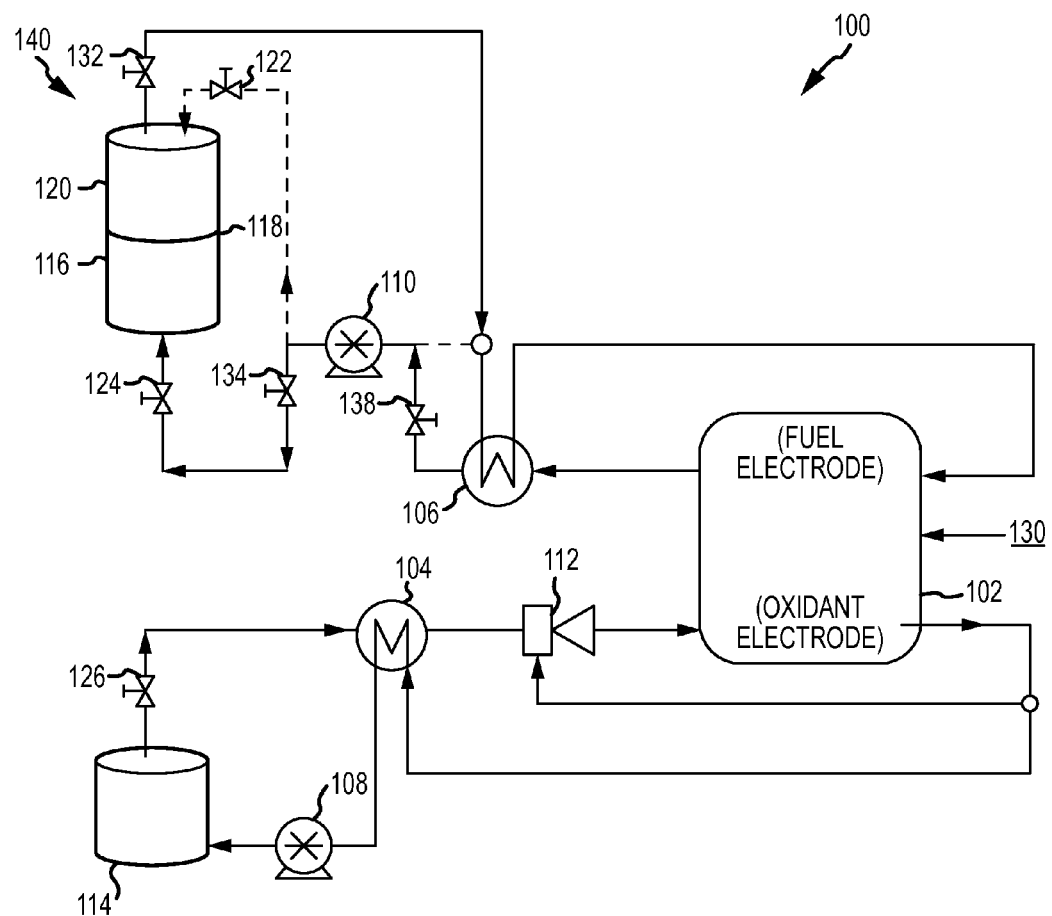
FIG. 2 illustrates an advanced energy storage device in the charge mode.

One embodiment of the invention is an advanced energy storage device, which is illustrated FIGS. 1 and 2. FIG. 1 illustrates an advanced energy storage device in the discharge mode, while FIG. 2 illustrates an advanced energy storage cell in the charging mode. FIG. 1 illustrates the flow path of the fuel in the charging mode as dashed lines and this mode is discussed in further detail with reference to FIG. 2. The device 100 comprises a solid oxide flow battery module 102, oxygen (or oxidant) preheater 104, fuel preheater 106, oxidant pump 108, fuel pump 110, oxidant recycle device (ejector or blower), oxidant storage tank 114, SOFC fuel storage tank 116 and a SOEC tank 120. In some embodiments, the SOFC storage tank 116 and the SOEC tank 120 are a single tank, while in other embodiments, the SOFC storage tank 116 and the SOEC tank 120 are separate tanks. Realizing the novel concept of a high-efficiency, reversible SOFB system requires understanding of numerous system-level considerations. For example, the system design illustrated in FIG. 1 illustrates a 'battery' in discharge-mode (i.e., power producing fuel cell operation) operating nominally between about 600° C. and about 800° C., in some embodiments at about 650° C.

In an embodiment of the invention, the oxidant is pure oxygen, which is discharged from an oxidant storage tank 114, partially preheated in the pre-heater 104 to a temperature between about 300° C. to about 500° C., and mixed with cathode tail-gas via an oxidant recycle device 112 and admitted to the SOFB 102 at the cathode. Valve 126 may be used to control the flow of the oxidant to the oxidant preheater 104. In some embodiments, the oxidant is oxygen, though it is understood that any suitable oxidant (such as ambient air) may be used in the system. In discharge mode, some excess oxygen (i.e., above stoichiometric requirements) is supplied to the SOFB 102 to maintain the desired operating temperature. A small fraction of the supplied oxygen is returned to the oxidant storage tank 114 via the oxidant pump 108.

In the discharge mode, fuel is discharged from the pressurized SOFC fuel storage tank 116, preheated in the fuel preheater 106 to the anode inlet temperature between about 550° C. to about 600° C. As fluid is discharged from the SOFC fuel storage tank 116, the separation device 118 moves between the SOFC storage tank 116 and the SOEC tank 120. Though FIG. 1 illustrates the SOFC fuel storage tank 116 and the SOEC tank 120 as two separate tanks, it is understood that it may be a single tank 140 and may contain a separation device 118. The separation device 118 may be any suitable device, such as a free or floating piston, or through use of a bladder for example. Optional valve 124 may be used to control the flow of the fuel to the fuel preheater 106. In some embodiments, the fuel preheater 106 is a recuperative heat exchanger.

The separation device 118 moves between the SOFC storage tank 116 and the SOEF tank 120 as gases are added to the SOEC tank 120. Optional valve 122 controls the flow of the gases into the SOEC tank 120. Heated fuel exiting the preheater 106 is delivered to the SOFB 102 where it is electrochemically oxidized to produce electric power 130.

In some embodiments, the fuel preheater 106 and/or the oxidant preheater 104 comprises high-performance heat exchangers and/or optional chemical reactors. In still another embodiment, a class of high-effectiveness all-ceramic microchannel heat exchangers is provided. In some embodiments, the SOFB performance may be enhanced by incorporating catalysts into the heat exchangers. Suitable catalyst materials include nickel- and rhodium-based catalysts.

For the purposes of analysis, the fuel gas is approximated as a mixture of about 45% $H_2$, about 27% $H_2O$, and about 28% $CH_4$. Anode gas products are cooled and pumped into a separate solid oxide electrolytic cell (SOEC) tank 120 for 'reactant' storage where it will eventually be used when the system is charging (i.e., power consuming electrolysis operation). The overall SOFB system concept as depicted here offers a simple and novel approach to achieving high efficiency, self-sustaining operation.

Design considerations include establishing (i) the appropriate fuel cell operating conditions (e.g., T, p, fuel utilization), (ii) desired tank storage statepoints (T, p, and composition), (iii) thermal management of the SOFB module, and (iv) ensuring that parasitic pumping power requirements are minimized to enable maximum system efficiency. The operating temperature of the fuel cell is between about 600 to about 800° C. The operating pressure is between about 1 bar to about 20 bar and the fuel utilization is between about 30 to about 95%. The desired storage statepoints depends on the composition of the fluids stored. A suitable range for the storage statepoints is a temperature between about 10° C. and about 350° C. A suitable range for the storage statepoints pressures are between about 1 bar and about 20 bar. The composition is primarily concerned with whether or not water vapor is stored separately or mixed with the other gases and therefore varies.

FIG. 2 illustrates an advanced energy storage cell in the charging mode. The flow of the fuel in the discharge mode are shown as dashed line and discussed in detail in FIG. 1. Power 130 is used to charge the SOFC tank 116.

In an embodiment of the invention, the oxidant is pure oxygen, which is discharged from an oxidant storage tank 114, partially preheated in the pre-heater 104 to a temperature between about 300 to about 500° C., and mixed with cathode tail-gas via an oxidant recycle device 112 and admitted to the SOFB 102. Valve 126 may be used to control the flow of the oxidant to the oxidant preheater 104. In some embodiments, the oxidant is oxygen, though it is understood that any suitable oxidant (such as ambient air) may be used in the system. In charging mode, some excess oxygen (i.e., above stoichiometric requirements) is supplied to the SOFB stack to maintain the desired operating temperature. A small fraction of the supplied oxygen is returned to the oxidant storage tank 114 via the oxidant pump 108.

The SOEC tank 120 discharges the reactant gases where valve 132 maintains supply pressure in electrolysis mode at the desired SOEC operating condition. The reactant gas mixture is directed to the preheater 106. The reactant gas mixture, established from the anode outlet of the SOFB 102 produced when the fuel cell is in the operating mode is approximately comprised of about 9% $H_2$, about 71% $H_2O$, about 6% $CH_4$, about 1% CO, and about 13% $CO_2$. The reactant gas mixture is recuperatively preheated to about between about 525° C. to about 625° C., preferably about 550° C. by the anode tail-gas and delivered to the SOFB 102. The operating conditions of the SOFB 102 are typically at a temperature between about 600° C. and about 800° C. and a pressure of between about 1 bar and about 20 bar. However, it is understood that the actual operating conditions will be dependent upon the system requirements, which will depend upon the actual use. Under pressurized operating conditions, the hydrogen and carbon monoxide electrochemically produced present thermodynamically favorable conditions to generate considerable amounts of methane. The methane may amount to greater than about 40% of the resulting SOFC 'fuel' composition on a volume basis. In this simple example, the electrolysis mode of operation is estimated to achieve an electrolytic efficiency of about 90% at about 10 atm operation. The electrolyzer efficiency is defined as the change in heating value of the anode gas from inlet to outlet divided by the gross dc power added to the SOFB system. This high efficiency translates into an overall round-trip system efficiency of nearly about 80% from the system concept and higher temperature materials set (i.e., yttria-stabilized zirconia (YSZ)). The fuel exits the preheater 106. Optionally, the flow may be controlled with valves 138 and 134, which are positioned before and after the pump 110. Optional valve 124 controls the flow of the fuel into the SOFC tank 116.

An aspect of the present invention is that the SOFB is operational in at least two modes that are reversible. In order to ensure reversible operation over the life of the system requires that when the SOFB is discharged in the fuel cell operating mode, the resulting anode tail-gas composition is suitable for electrolyzer operation. Likewise, when reversing the operating mode of the SOFT, the anode exhaust gas composition produced from electrolysis serves as the fuel for discharging mode. Thus, the 'fuel' may be returned to its respective storage tank as close as is possible to its initial composition in order to achieve a quasi-steady-state roundtrip operation.

System analyses indicates the net SOFB system efficiencies of greater than about 85% are possible in fuel cell operating mode at about 650° C. on standard anode-supported YSZ material sets. Net system efficiency is defined herein as net dc power delivered by the system divided by fuel energy (LHV-basis) supplied from the SOFC storage tank. Such high-efficiency is achievable by a combination of low cell overpotential (approximately 100 mV) operating point selection, high operating pressure, near-pure oxygen as the oxidant, and careful system architecture that minimizes pumping parasitics. Such high-efficiencies are also possible as the system is not penalized for low fuel utilizations. The importance of system operating pressure is not to be underestimated for a variety of reasons which become clear when considering both discharging and charging SOFB operating modes.

FIG. 3 illustrates optimal system efficiency with varying fuel utilization and system operating pressure. Pressurization of the system may increase net efficiency by about 20-percentage points, which is critical to achieving the goal of greater than about 80% roundtrip efficiency. Second, high system pressures favor low parasitic power and smaller storage tank requirements for a given discharge run-time. For instance, it is estimated that about a 5 time reduction in tank pumping power requirements may be realized when operating the system at about 10 atm versus about 1.1 atm due to the reduced required pressure ratios across the pumping device. Additionally, in electrolysis charging-mode high pressure operation favors the production of methane, which vastly improves both thermal management of the SOFB stack and the energy density of the fuel. Because of the lack of fuel reforming, combustors, excessively high temperature heat exchangers, and the need to achieve high reactant utilizations for the sake of efficiency, high SOFB efficiencies may be realized with relatively simple and elegant system concepts.

Figure 3A:
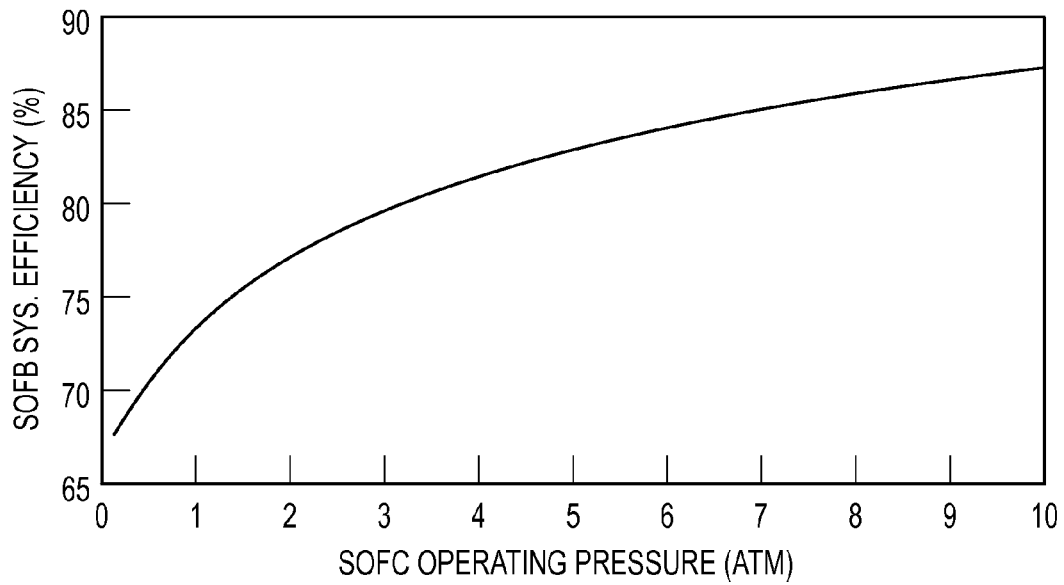
FIG. 3 illustrates optimal system efficiency with varying fuel utilization and system operating pressure.

FIG. 3a illustrates a SOFC operating pressure and SOFB system efficiency. The temperature of the SOFC illustrated in FIG. 2a was approximately 650° C. The pressure in the SOFC tank was approximately 25 atm and the fractional fuel utilization, $U_{fi}$ was approximately 53%. As the operating pressure of the SOFC increased, the SOFB system efficiency also increased. Operating the SOFB in electrolysis mode requires considerations of reactant storage and preheat, pumping power, and achieving self-sustaining thermal operation of the system. In particular, maintaining cell temperature during the highly endothermic electrolysis operating mode is a primary concern and several strategies are possible. These methods include transferring thermal energy from higher temperature reactant gases to the cell, thermal storage in the mass of the SOFB module, and operating at high overpotential, thereby providing resistive heating. These strategies result in either large inefficiencies or limit charge/discharge times. Fortunately, increasing operating pressure favors the production of methane which is a highly exothermic reaction that tends to provide a more thermoneutral operating condition for the cell-stack. This effect may be quantitatively seen from the data in Table 1 which summarizes the heats of reaction at about 650° C. for electrolysis, water-gas shift, and methanation (i.e., reverse reforming and Sabatier reactions).

TABLE 1

| Heats of Reactions | |
|---|---|
| Reaction | $\Delta H°_{923}$ (kJ/mol) |
| $H_2O \leftrightarrow H_2 + 0.5O_2$ | 247.3 |
| $CO_2 \leftrightarrow CO + 0.5O_2$ | 282.9 |
| $3H_2 + CO \leftrightarrow CH_4 + H_2O$ | −224.4 |
| $4H_2 + CO_2 \leftrightarrow CH_4 + 2H_2O$ | −188.8 |
| $CO + H_2O \leftrightarrow CO_2 + H_2$ | −35.6 |

Figure 3B:
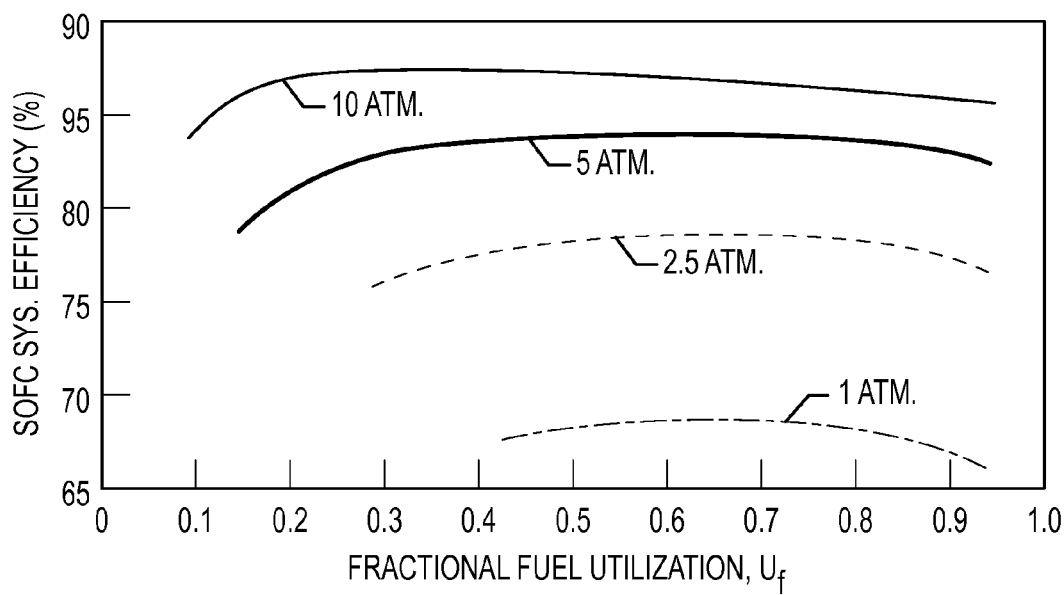

FIG. 3b illustrates the SOFC system efficiency as a function of the fractional fuel utilization over several pressures. The overpotential was about 100 mV and the temperature of the SOFC was about 650° C.

Figure 4:
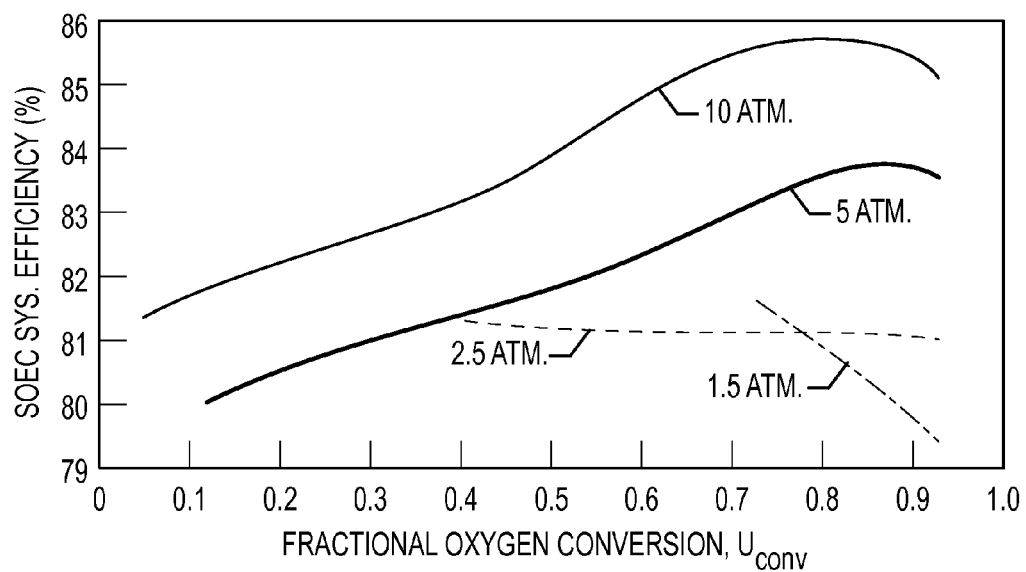
FIG. 4 illustrates the SOEC system efficiency as a function of the fractional oxygen conversion $U_{conv}$.
Figure 5:
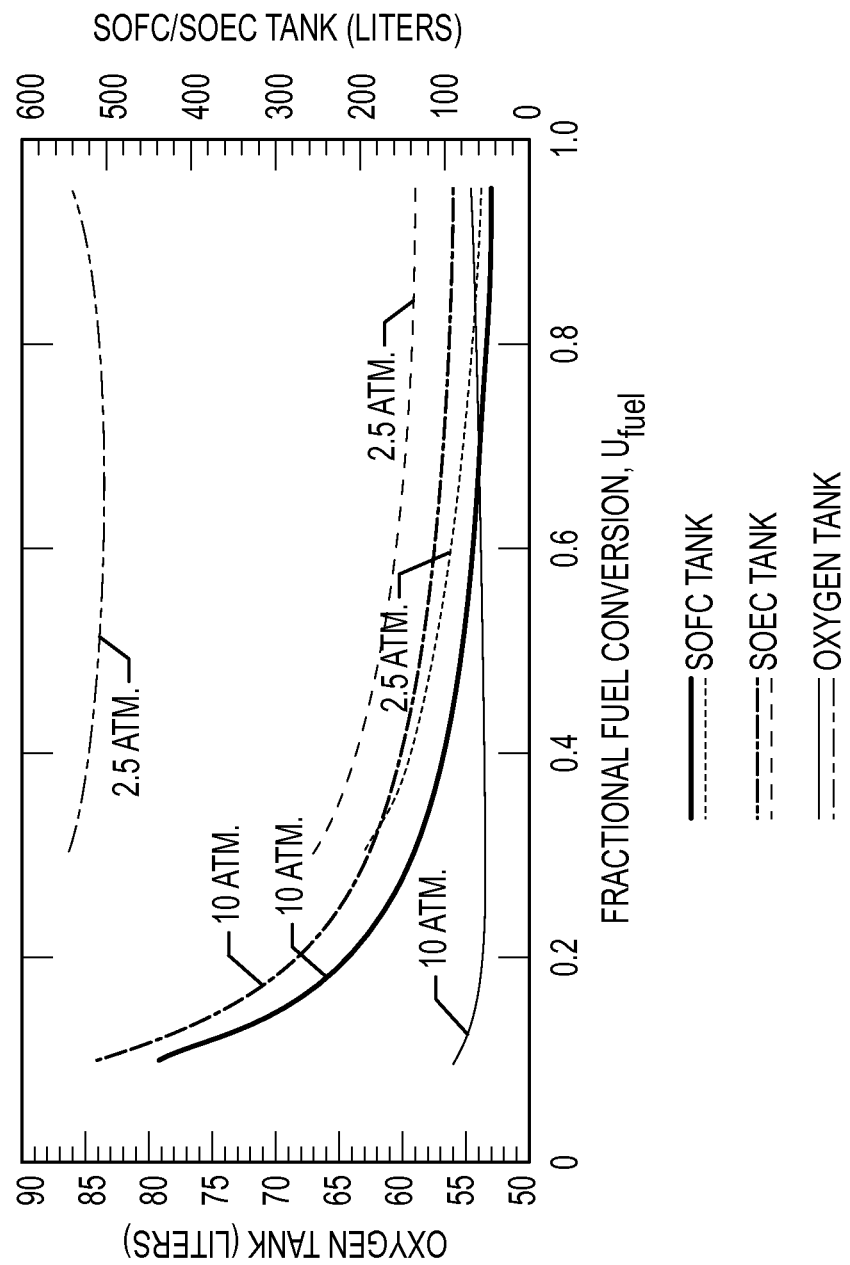
FIG. 5 illustrates oxygen, SOFC, and SOEC tank sizing for system operation at about 2.5 atm and about 10 atm.

FIG. 4 illustrates the SOEC system efficiency as a function of the fractional oxygen conversion $U_{conv}$ and further supports the importance of elevated operating pressure on system performance and, importantly, indicates compatibility with the pressure selection in fuel cell operating mode.

Furthermore, one may see from FIG. 4 the effect of lower pressure operation on maintaining high efficiency performance as a function of fractional reactant conversion. Several operating pressures are illustrated on the graph. As more of the reactants are converted to 'fuel' by electrolysis, the system efficiency increases as the relative gain in fuel heating value exceeds the required electrical energy input. The situation is complicated by the fact that at lower pressures less methanation occurs and electrolytic efficiency is altered; eventually, fuel production is offset by power requirements and limits in achieving thermally self-sustaining operation (see curves for 2.5 atm and 1.5 atm operation).

Maintaining thermal control and elevated operating temperature are important design considerations. The thermal behavior of the stack is normally different in fuel-cell mode than in electrolysis mode. As a fuel cell, both the cell reaction and the polarization are exothermic, producing net excess heat. As an electrolyzer, the cell reaction is endothermic while the polarization losses remain exothermic. Thus, maintaining operating temperature during electrolysis usually requires heat produced by high overpotentials that result in low efficiency. On the other hand, there is usually considerable excess heat to be dissipated in fuel cell mode.

The present innovation allows a more thermally-balanced situation; with the thermally-neutral voltage near the Nernst potential such that there is net heat production in both electrolysis and fuel cell modes. Calculations for electrolysis at elevated pressure and reduced temperature show that net heat production begins at overpotentials less than about 0.1 V due to highly exothermic methane formation. This important result provides further compelling evidence at the stack-level for operating the SOFB at elevated pressures. There is ample evidence that fuel-cell stacks and systems may be sufficiently insulated to maintain self-sustaining operation even under high efficiency, low polarization conditions.

Unique attributes of the SOFB system of the present invention include both the pressurized storage of gaseous reactants and the manner in which a constant pressure storage characteristics is achieved within the system. Storage tanks have been sized based on a 4-hour discharge time at a nominal capacity of about 1 kW net dc power output.

FIG. 4 illustrates oxygen, SOFC, and SOEC tank sizing for system operation at about 2.5 atm and about 10 atm. Tank storage pressure is based on SOFB operating pressure plus a fixed 15 bar pressure rise across the pumps.

For instance, at about 60% fuel utilization, approximately 208 liters (about 55 gal) of total reactant storage at about 25-atm is required for an about 4-kWh rated system. Operation at about 2.5 atm requires about 322 liters (about 85 gal) of total storage.

Storage tanks introduce an inherently dynamic element into the system operation and deserve careful consideration in design and operating control. As gases are either removed or added to the tank, the thermodynamic state of the tank changes with time. Additionally, such changes during tank discharge result in a time-varying enthalpy of the gas as it flows into the reactant preheaters. Thus, while system pressure may be controlled by a pump and control valve, tank outlet gas temperature needs to be effectively managed for heat exchanger operation and temperature control into the SOFB.

Previous experience in the design of air-independent SOFC systems suggest that cathode gas recycle via an ejector may provide a means for effective cathode inlet temperature control. Oxygen tank pressure will gradually decrease during SOFC operating mode, but the tank temperature and pressure decrease is mitigated somewhat by the return of 'depleted' cathode gases to the tank by the oxidant pump. On the fuel side, a novel concept for the use of single fuel tank in which the SOFC and SOEC compartments are separated by a moveable partition, such as a floating or free piston may offer some additional advantages in tank sizing and temperature and pressure control when switching between operating modes.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A battery system, comprising:
   a reversible solid oxide electrochemical cell, wherein the reversible solid oxide electrochemical cell is capable of operating in a discharge mode and a charging mode;
   a storage tank, wherein the storage tank provides a fuel gas to the reversible solid oxide electrochemical cell when the reversible solid oxide electrochemical cell is in the discharge mode, and wherein the storage tank provides a reactant gas to the reversible solid oxide electrochemical cell when the reversible solid oxide electrochemical cell is in the charging mode, and wherein the storage tank further comprises a separation device that separates the fuel gas from the reactant gas;
   a fuel pump, wherein the fuel pump provides the fuel gas and the reactant gas to be stored in the storage tank; and
   a preheater, wherein the preheater heats the fuel gas provided to the reversible solid oxide electrochemical cell from the storage tank when the reversible solid oxide electrochemical cell is in the discharge mode, and wherein the preheater heats the reactant gas provided to the reversible solid oxide electrochemical cell from the storage tank when the reversible solid oxide electrochemical cell is in the charging mode;
   wherein the reactant gas comprises hydrogen gas, water, methane, carbon monoxide, and carbon dioxide and the fuel gas comprises hydrogen gas, water, and methane.

2. The battery system of claim 1, wherein the separation device is selected from the group consisting of a free piston, a floating piston and a bladder.

3. A battery system, comprising:
   a reversible solid oxide electrochemical cell, wherein the reversible solid oxide electrochemical cell is capable of operating in a discharge mode and a charging mode;
   a first storage tank, wherein the first storage tank provides a fuel gas to the reversible solid oxide electrochemical cell when the reversible solid oxide electrochemical cell is in the discharge mode;
   a second storage tank, wherein the second storage tank provides a reactant gas to the reversible solid oxide electrochemical cell when the reversible solid oxide electrochemical cell is in the charging mode;
   a separation device, wherein the separation device moves between the first storage tank and the second storage tank and wherein the separation device separates the fuel gas from the reactant gas;
   a fuel pump, wherein the fuel pump provides the fuel gas stored in the first storage tank and provides the reactant gas stored in the second storage tank; and
   a preheater, wherein the preheater heats the fuel gas provided to the reversible solid oxide electrochemical cell from the first storage tank when the reversible solid oxide electrochemical cell is in the discharge mode, and wherein the preheater heats the reactant gas provided to the reversible solid oxide electrochemical cell from the storage tank when the reversible solid oxide electrochemical cell is in the charging mode;
   wherein the reactant gas comprises hydrogen gas, water, methane, carbon monoxide, and carbon dioxide and the fuel gas comprises hydrogen gas, water, and methane.

* * * * *